> United States Patent Office 3,755,388
Patented Aug. 28, 1973

3,755,388
CAGED BORON-NITROGEN COMPOUNDS CONTAINING ESTER SUBSTITUTION
Jerome H. Ludwig, Cleveland, and Kenneth J. Witsken, Cincinnati, Ohio, assignors to Emery Industries, Inc., Cincinnati, Ohio
No Drawing. Original application Feb. 23, 1968, Ser. No. 707,809. Divided and this application May 18, 1971, Ser. No. 144,643
Int. Cl. C07c 69/00
U.S. Cl. 260—404                               6 Claims

ABSTRACT OF THE DISCLOSURE

Caged boron-nitrogen compounds having the formula:

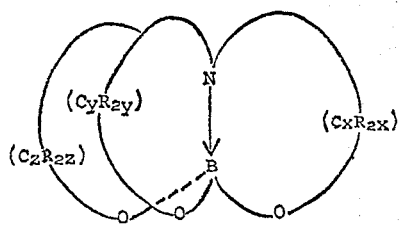

Certain of the compounds of this invention contain at least one ring substituent whereas with others at least two of the rings of the compounds are substituted, with at least one of the rings being substituted with a hydroxyalkyl, aminoalkyl, arylalkyl, aryl, ester, amido or ether radical, and at least one of the remaining rings being substituted with one of these radicals or an alkyl radical, but one ring need be substituted when the substituent is a higher $C_8$–$C_{22}$ alkyl radical, a hydroxyl group, a higher $C_8$–$C_{22}$ ether or ester, or an alkyl higher ($C_8$–$C_{22}$) ether or ester. Exemplary of these compounds are 3,7,10-trihydroxymethyl-2,8,9-trioxa - 5 - aza - 1 - boratricyclo[3.3.3.0]undecane; 3-methyl-7,10-diphenyl-2,8,9-trioxa-5-aza - 1 - boratricyclo [3.3.3.0]undecane; and 3-hydroxymethyl-7,10-dimethyl-2,8,9-trioxa-5-aza-1-boratricyclo[3.3.3.0]undecane stearate. The compounds are useful as antistatic agents in natural and synthetic, polymeric fibers and films, and as color improving agents for fatty acid distillations.

---

This is a division of application Ser. No. 707,809 filed Feb. 23, 1968, now abandoned.

This invention relates to certain new compounds. More particularly, it relates to substituted cage boron-nitrogen compounds containing organic substituents on at least two of the rings of the compound.

The caged boron-nitrogen compounds of this invention have the formula:

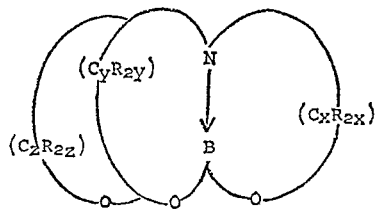

FORMULA I wherein (a) $x$, $y$, and $z$ are the same or different integers of from 2 to 4 and indicate the number of carbon atoms present in the respective rings of the compound and the number of R substituents attached to said carbon atoms;

(b) At least one R substituent of one of said rings is selected from the group consisting of aryl radicals;

$C_2$ to $C_6$ alkenyl radicals; a hydroxyl group; hydroxy-substituted $C_1$ to $C_6$ lower alkyl radicals; amino-substituted $C_1$ to $C_6$ alkyl radicals; aryl-substituted lower alkyl radicals; radicals of the formula

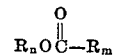

wherein $R_n$ is O or a lower alkylene radical containing 1 to 6 carbon atoms and $R_m$ is an aliphatic radical (alkyl or alkenyl) having 1 to 18, or more, carbon atoms, or an aryl radical; and radicals of the formula $R_nOR_p$, where $R_n$ is as defined above and $R_p$ is a $C_1$ to $C_6$ lower aliphatic radical or an aryl radical; and (c) At least one R substituent of one other ring of said compound is selected from the group consisting of alkyl radicals containing from 1 to about 16 carbon atoms; cycloalkyl radicals containing from 3 to about 7 carbon atoms; alkenyl and cycloalkenyl radicals containing from 2 to about 7 carbon atoms; aryl radicals; hydroxy groups; hydroxy-substituted $C_1$ to about $C_6$ lower alkyl radicals; amino-substituted $C_1$ to about $C_6$ lower alkyl radicals; lower alkyl-substituted aryl radicals; aryl-substituted lower alkyl radicals; radicals of the formula:

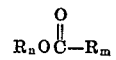

where $R_n$ is O or a lower alkylene radical containing 1 to about 6 carbon atoms and $R_m$ is an aliphatic radical (alkyl or alkenyl) having 1 to about 18 or more carbon atoms, or an aryl radical; radicals of the formula: $R_nOR_p$ where $R_n$ is as defined above and $R_p$ is a $C_1$ to about $C_6$ lower aliphatic radical or an aryl radical; and hydrogen when the R substituted of (b) is selected from the group consisting of higher $C_8$ to $C_{22}$ alkyl radicals, a hydroxyl group, radicals of the formula

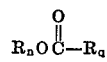

wherein $R_n$ is as defined above and $R_q$ is an alkyl radical having from about 8 to 22 carbon atoms and radicals of the formula $R_nO$—$R_q$ wherein $R_n$ and $R_q$ are as defined above.

As will be understood from the above formula, at least two of the rings of the caged boron-nitrogen compounds of this invention are substituted, with at least one of the rings having a substituent selected from aryl radicals, hydroxyalkyl radicals, aminoalkyl radicals, arylalkyl radicals, and ester, amido or ether radicals having the formula:

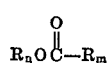

or $R_nOR_p$. The substituent of the remaining substituted ring or rings of the compound can be any of these radicals or an alkyl, alkenyl, cycloalkyl or cycloalkenyl radical.

It is to be understood that the term "aryl radical," as used herein to describe certain of the ring substituents, is intended to include substituted aryl radicals, such as alkyl-, alkoxy-, nitro-, or cyano-substituted aryl radicals. It is also to be understood that Formula I above is intended to include compounds wherein the R substituents on adjacent carbon atoms of a ring of the compound are bonded together to form a cycloalkyl or cycloalkenyl radical. For example, the caged boron-nitrogen compounds of this invention include:

[3,7-bis(4-methyl-phenyl)-2,8,9-trioxa-5-aza-1-boratricyclo [3.3.3.0]undecane]

[3,7-bis(3-nitro-4-methoxyphenyl)-2,8,9-trioxa-5-aza-1-boratricyclo[3.3.3.0]undecane]

and

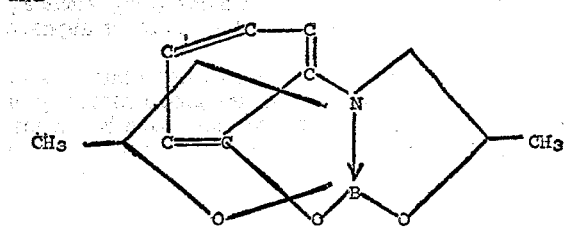

[11,14-dimethyl-2,12,13-trioxa-9-aza-1-boratetracyclo [7.3.3.0.0$^{3,8}$]pentadeca-3,5,7-triene].

The compounds of this invention can contain the same substituent on each of the substituted rings of the compound. Exemplary of such compounds are 3,7,10-triphenyl-2,8,9-trioxa-5-aza-1-boratricyclo[3.3.3.0]undecane and 3,7,10-trihydroxymethyl-2,8,9-trioxa-5-axa-1-boratricyclo [3.3.3.0]undecane. The compounds of this invention can also contain different substituents on some or all of the compound's rings. Exemplary of such compounds are 3-methyl - 7,10 - diphenyl-2,8,9-trioxa-5-aza-1-boratricyclo [3.3.3.0]undecane; 3,7-dimethyl-10-phenyl-2,8,9-trioxa-5-aza - 1-boratricyclo[3.3.3.0]undecane; 3-hydroxymethyl-7-methyl-2,8,9-trioxa-5-aza-1-boratricyclo[3.3.3.0]undecane and the like.

At least one of the rings of the compounds of this invention is substituted by one or more aryl, hydroxyalkyl, aminoalkyl, arylalkyl, ester, amido or ether radicals. The aryl radicals, which can be present as substituents to the ring include, for example, phenyl and naphthyl radicals, and substituted aryl radicals such as, for example, 3-hydroxyphenyl; 2,4-dihydroxyphenyl; 3-methylphenyl; 3-nitro-4-methoxyphenyl radicals, and the like.

The hydroxy-substituted alkyl radicals which can be present as substituents on the rings of the compounds of this invention contain from 1 to 6 carbon atoms and include such radicals as hydroxymethyl, hydroxyethyl, 2-hydroxybutyl radicals and the like. The amino-substituted alkyl radicals, which can be present in the rings of the compounds of this invention, can also contain 1 to 6 carbon atoms and thus include amino-ethyl, 1-aminopropyl, 2-amino-butyl radicals and the like.

The rings of the caged boron-nitrogen compounds of this invention can also be substituted by an arylalkyl radical such as phenylmethyl, phenylpropyl and phenylhexyl radicals, and the like. The ester, ether or urethane substituents to the rings of the compounds of this invention can include such radicals as

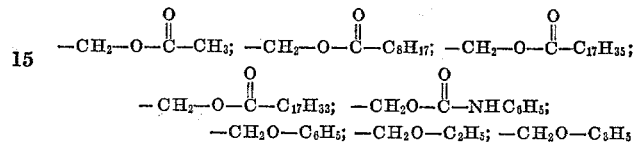

$-CH_2-O-\overset{O}{\underset{\|}{C}}-C_{17}H_{33}$; $-CH_2O-\overset{O}{\underset{\|}{C}}-NHC_6H_5$;

$-CH_2O-C_6H_5$; $-CH_2O-C_2H_5$; $-CH_2O-C_3H_5$

It also is to be understood that the definition of $R_m$ as an aryl radical in Formula I above (in defining substituents of the formula

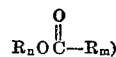

is intended to include alkyl-, hydroxy-, amino-, or cyano-substituted aryl radicals, and the like. Thus, the compounds of this invention can have the formulas:

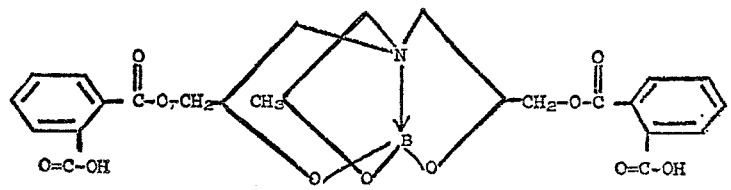

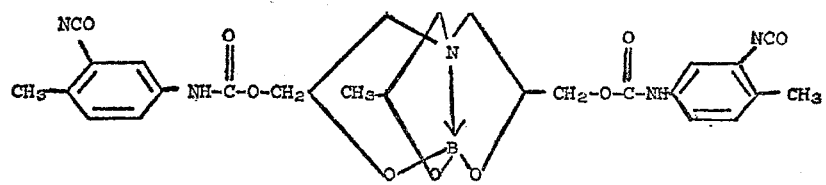

Where at least one ring of the caged boron-nitrogen compounds of this invention is substituted in the manner described above, the substituents to the remaining rings of the compound can be alkyl, alkenyl, cycloalkyl or cycloalkenyl groups, as well as the aryl, hydroxyalkyl, aminoalkyl, aryl-alkyl, ester, amido or ether radicals described above. Alkyl groups containing 1 to 16 carbon atoms such as methyl, ethyl, propyl, pentyl, hexyl, octyl, dodecyl, tetradecyl, hexadecyl radicals and the like; alkenyl groups containing 2 to 6 carbon atoms, such as ethenyl, 1-propenyl and 2-hexenyl radicals and the like; cycloalkyl groups containing 3 to 7 carbon atoms such as cyclohexyl radicals and the like; and cycloalkenyl radicals containing 3 to 7 carbon atoms, such as 2-cyclohexenyl radicals, thus can be present as substituents in these rings where at least one other ring is substituted in the manner previously described.

As was noted earlier, but one ring substituent is required (although others including those described herein may be present) when that substituent is a higher alkyl radical having from about 8 to 22 carbon atoms, a hydroxyl group or an alkyl ether or ester having from about 8 to 22 carbon atoms.

The caged boron-nitrogen compounds of this invention can contain five-membered rings, six-membered rings, seven-membered rings, or mixtures thereof. Each of these rings can be substituted at one or more carbon atoms of the ring. Thus the substituents to each ring can be attached to any carbon atom on any of the rings. The compounds of this invention thus include 4-methyl-7,10-diphenyl-2,8,9-trioxa-5-aza - 1 - boratricyclo[3.3.3.0]undecane and 4,4-dimethyl-7-methyl-10-phenyl-2,8,9-trioxa-5-aza-1-boratricyclo[3.3.3.0]undecant and the like.

Thus the caged boron-nitrogen compounds of this invention can have, for example any of Formulas II through VI below, in which the R substituents are as defined in Formula I.

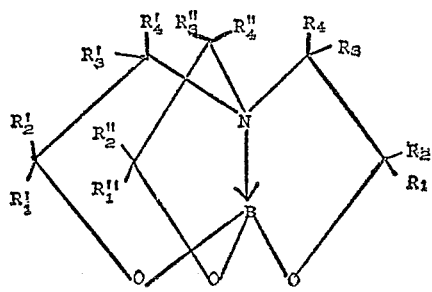

FORMULA II

Substituted 2,8,9-trioxa-5-aza-boratricyclo[3.3.3.0]undecanes ($x=2$, $y=2$, $z=2$)

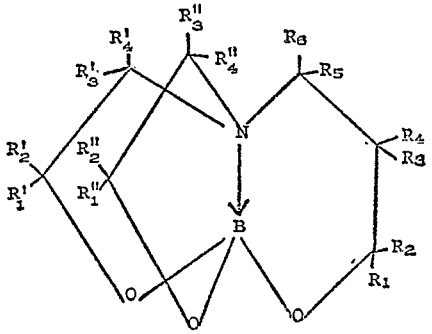

FORMULA III

Substituted 2,9,10-trioxa-6-aza-1-boratricyclo[4.3.3.0] dodecanes ($x=3$, $y=2$, $z=2$)

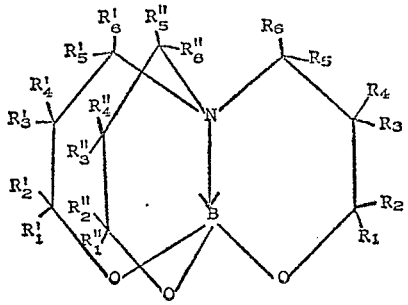

FORMULA IV

Substituted 2,10,11-trioxa-6-aza-1-boratricyclo[4.4.3.0] tridecanes ($x=3$, $y=3$, $z=2$)

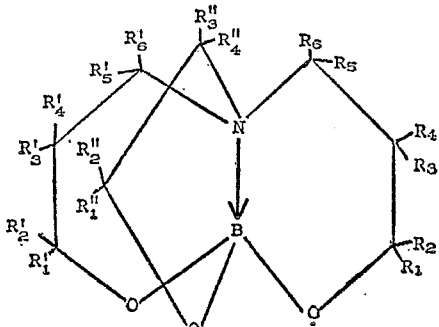

FORMULA V

Substituted 2,10,11-trioxa-6-aza-1-boratricyclo[4.4.4.0] tetradecanes ($x=3$, $y=3$, $z=3$)

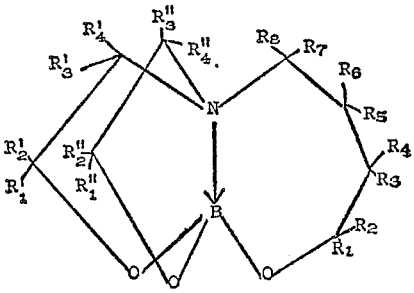

FORMULA VI

Substituted 2,10,11-trioxa-7-aza-1-boratricyclo[5.3.3.0] tridecanes ($x=4$, $y=2$, $z=2$)

In their preferred form, however, the compounds of this invention are substituted only at the 3-carbon of two or three of the compound's rings, with the remaining carbon atoms of the rings being satisfied with hydrogen atoms.

The preferred compounds of this invention, therefore, have the formula:

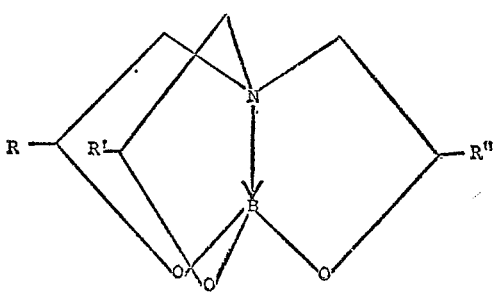

where each R substituent is as defined in Formula I. The substituents, of course, can be the same or different.

It is to be understood that the compounds of this invention may, in fact, exist as mixtures of various isomers. For example, 3,7,10-triphenyl-2,8,9-trioxa-5-aza-1-boratricyclo[3.3.3.0]undecane is probably a mixture of four (4) isomers differing in the configuration of the phenyl groups on the 3, 7 and 10 carbon atoms, i.e., in whether the phenyl substituent on each of the rings is in the position indicated by $R_1$ or $R_2$, $R_1'$ or $R_2'$, and $R_1''$ or $R_3''$ in Formula II. Each of these isomers and mixtures thereof are intended to be included within the term 3,7,10-triphenyl-2,8,9-trioxa-5-aza - 1 - boratricyclo[3.3.3.4]undecane; and isomers of other of the compounds of this invention are intended to be covered in like manner.

Certain of the isomeric forms of the compounds of this invention can include an enlargement of one or more of the rings of the compounds. For example, it has been found that 3,7,10-trihydroxymethyl-2,8,9-trioxa-5-aza-1-boratricyclo[3.3.3.0]undecane exists as a mixture of isomers, at least about 80% of which contain one or more six-membered rings. Thus, this compound is most likely a mixture of the following ring isomers:

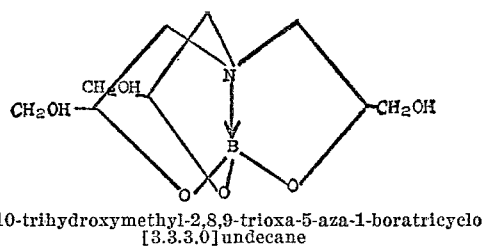

3,7,10-trihydroxymethyl-2,8,9-trioxa-5-aza-1-boratricyclo
[3.3.3.0]undecane

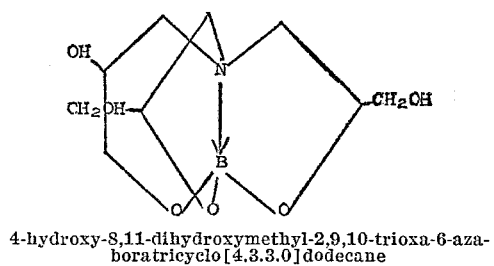

4-hydroxy-8,11-dihydroxymethyl-2,9,10-trioxa-6-aza-
boratricyclo[4.3.3.0]dodecane

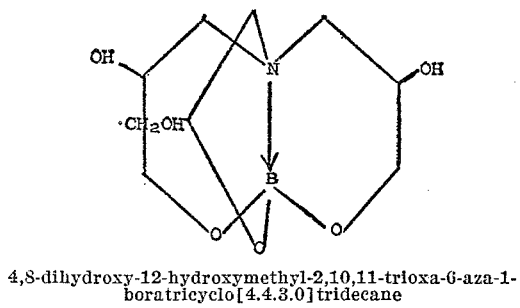

4,8-dihydroxy-12-hydroxymethyl-2,10,11-trioxa-6-aza-1-
boratricyclo[4.4.3.0]tridecane

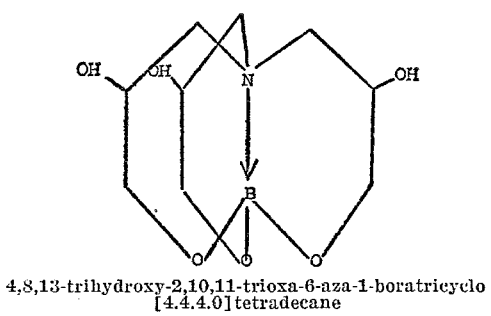

4,8,13-trihydroxy-2,10,11-trioxa-6-aza-1-boratricyclo
[4.4.4.0]tetradecane

The compounds of this invention can be prepared by reacting ammonia or an alkanolamine with an epoxy compound and then reacting the product of this first re-action with either boric acid or tributylborate. These reactions can be illustrated by the following equations:

(1) Preparation of amines

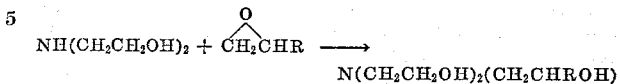
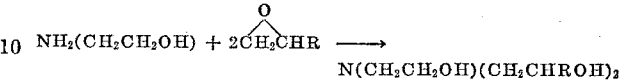

(2) Preparation of caged boron-nitrogen system

The reaction of the amine with boric acid or tributylborate is generally carried out under vacuum conditions at the end of the reaction to insure that the reaction is driven to completion. Reaction temperatures of about 135–200° C. are desirably employed. A detailed description of the preparation of various of the compounds of this invention is given in the specific examples which follow.

The ester, ether or amide compounds of this invention can be prepared directly in accordance with Equations 1 and 2 through reaction of epoxy esters, ethers, or amides with the amines in the first step of the reaction process. Such compounds can also be prepared by first preparing the hydroxyalkyl-substituted caged boron-nitrogen compounds and then converting them to the corresponding compounds by esterification or the like, as will also be shown in the following examples.

Specific examples of the caged boron-nitrogen compounds of this invention include:

3,7-dihydroxymethyl-2,8,9-trioxa-5-aza-1-boratricyclo-
  [3.3.3.0]undecane
3-methyl-7,10-diphenyl-2,8,9-trioxa-5-aza-1-boratricyclo-
  [3.3.3.0]undecane
3,7-dimethyl-10-phenyl-2,8,9-trioxa-5-aza-1-boratricyclo-
  [3.3.3.0]undecane
11,14-dimethyl-2,12,13-trioxa-9-aza-1-boratetracyclo-
  [7.3.3.0$^{8,8}$]pentadeca-3,5,7-triene
3-hydroxymethyl-7,10-dimethyl-2,8,9-trioxa-5-aza-1-
  boratricyclo[3.3.3.0]undecane
3,7-dihydroxymethyl-10-methyl-2,8,9-trioxa-5-aza-1-
  boratricyclo[3.3.3.0]undecane
3-phenoxymethyl-7,10-dimethyl-2,8,9-trioxa-5-aza-1-
  boratricyclo[3.3.3.0]undecane
3,7-diphenoxymethyl-10-methyl-2,8,9-trioxa-5-aza-1-
  boratricyclo[3.3.3.0]undecane
3,7,10-trihydroxymethyl-2,8,9-trioxa-5-aza-1-
  boratricyclo[3.3.3.0]undecane
3-hydroxymethyl-7,10-dimethyl-2,8,9-trioxa-5-aza-1-
  boratricyclo[3.3.3.0]undecane acetate
3-hydroxymethyl-7,10-dimethyl-2,8,9-trioxa-5-aza-1-
  boratricyclo[3.3.3.0]undecane palmitate
3-hydroxymethyl-7,10-dimethyl-2,8,9-trioxa-5-aza-1-
  boratricyclo[3.3.3.0]undecane stearate
3-hydroxymethyl-7,10-dimethyl-2,8,9-trioxa-5-aza-1-
  boratricyclo[3.3.3.0]undecane oleate
3-hydroxymethyl-7,10-dimethyl-2,8,9-trioxa-5-aza-1-
  boratricyclo[3.3.3.0]undecane pelagonate
3-dodecyl-2,8,9-trioxa-5-aza-1-boratricyclo[3.3.3.0]
  undecane
4-hydroxy-2,9,10-trioxa-6-aza-1-boratricyclo[4.3.3.0]
  dodecane
3-hydroxymethyl-2,8,9-trioxa-5-aza-1-boratricyclo-
  [3.3.3.0]undecane stearate
3-nonyloxymethyl-2,8,9-trioxa-5-aza-1-boratricyclo-
  [3.3.3.0]undecane
3-allyloxymethyl-7,10-dimethyl-2,8,9-trioxa-5-aza-1-
  boratricyclo[3.3.3.0]undecane
3-vinyl-7,10-dimethyl-2,8,9-trioza-5-aza-1-boratricyclo-
  [3.3.3.0]undecane Esters similar to those listed above can also be prepared from hydroxymethyl-substituted, caged, boron-nitrogen compounds and complex, commercially available mixtures of acids. Examples of such complex esters are:

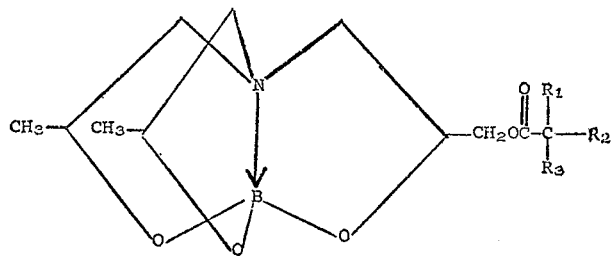

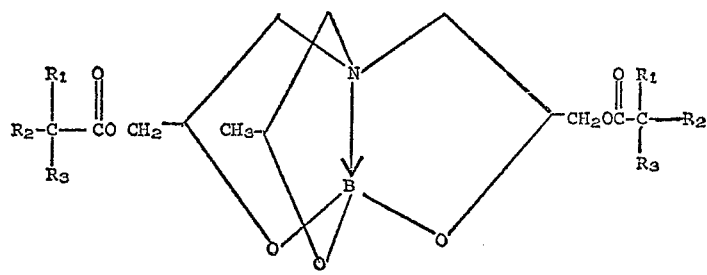

[wherein $R_1$, $R_2$, and $R_3$ are lower alkyl groups and have a total of about 7 to 9 carbon atoms]

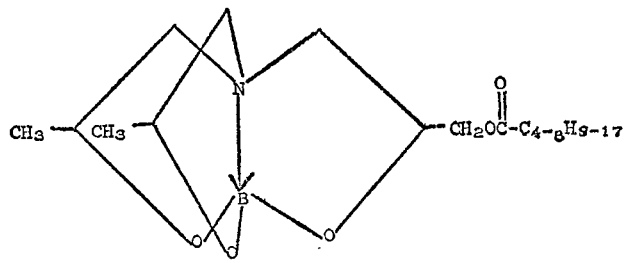

The compounds of this invention are useful as resin modifiers. For example, they are effective antistatic agents in polymeric materials such as polyvinyl chloride, polyethylene, polypropylene, vinyl chloride copolymers, polyvinyl acetate, polyethylene terephthalate, and the like, and on such naturally occurring materials as wool, cotton, silk and the like. Such synthetic and natural materials can be treated in fiber or sheet form with the compounds of this invention to improve their antistatic properties.

The nonflammability of natural and synthetic polymeric materials can be improved by treating them with the compounds of this invention, and thus these compounds are useful as nonflammable plasticizers for such materials. For example, 3 - hydroxymethyl - 7,10 - dimethyl - 2,8,9 - trioxa - 5 - aza - 1 - boratricyclo[3.3.3.0] undecane stearate is a particularly good antistatic agent in both polyethylene and polypropylene. The compounds of this invention are also useful as plastic film antifogging agents and as color improving agents for fatty acid distillations.

Thus, for example, these compounds can be added to the fatty acids, such as cottonseed oil fatty acids, during distillation to produce distillates of improved color.

To illustrate the invention more specifically, reference is now made to the following examples. These examples are merely illustrative and are not to be understood as limiting the scope and underlying principles of the invention in any way. The parts and percentages referred to herein are by weight unless otherwise specifically indicated.

While the compounds of this invention have been particularly described as caged boron-nitrogen compounds, in some instances caged aluminum-nitrogen compounds can also be provided in accordance with the invention.

Exemplary of such aluminum-nitrogen compounds are 3,7,10 - triphenyl - 2,8,9 - trioxa - 5 - aza - 1 - aluminotricyclo[3.3.3.0]undecane and 3 - hydroxymethyl - 7,10 - dimethyl - 2,8,9 - trioxa - 5 - aza - 1 - aluminotricyclo-[3.3.3.0]undecane.

EXAMPLE I

Preparation of 3,7-dihydroxymethyl-2,8,9-trioxa-5-aza-1-boratricyclo[3.3.3.0]undecane 34.3 parts by weight of ethanolamine were dissolved in 350 parts by weight of chloroform. 83.1 parts by weight of glycidol were added slowly with stirring. Exotherm resulted in reflux during addition. After addition of the glycidol, the mixture was heated and reflux continued for a total of 3¼ hours. The chloroform was then stripped from the amine by distillation under high vacuum. 22 parts by weight of the resulting amine and 24.2 parts by weight of tributylborate were heated slowly with stirring to 190° C. The butyl alcohol by-product was removed from the reaction mixture by distillation with last traces being removed under 2 mm. Hg vacuum. The resulting product, 3,7-dihydroxymethyl - 10 - methyl- 2,8,9 - trioxa - 5 - aza - 1 - boratricyclo[3.3.3.0]undecane, was confirmed by infrared spectrum. It was soluble in water, methanol and chloroform and decomposed on high vacuum distillation.

EXAMPLE 2

Preparation of 3,7-dimethyl-10-phenyl-2,8,9-trioxa-5-aza-1-boratricyclo[3.3.3.0]undecane 120.1 parts by weight of styrene oxide were added dropwise to 133.2 parts by weight 1,1'-iminodi-2-propanol, with stirring, over a 3 hour period at a temperature of 30–50° C. After this addition was completed, the reaction temperature was raised to 75° C. to complete the reaction. 230.2 parts by weight of tributylborate were added to the reaction mixture and the temperature increased slowly to 180° C. to remove the butyl alcohol by-product by distillation. The final butanol removal was accomplished by vacuum distillation. The resulting product was 3,7-dimethyl - 10 - phenyl - 2,8,9 - trioxa-5-aza - 1 - boratricyclo[3.3.3.0]undecane. Its structure was confirmed by infrared spectrum analysis. This product had a melting point of approximately 140° C., and a boiling point of 250–275° C. at 1 mm. Hg. It was soluble in hot water and isopropanol.

Incorporation of the product of this example in sheets of polyvinyl chloride was found to produce a polymeric material having good antistatic properties.

EXAMPLE 3

Preparation of 3-methyl-7,10-diphenyl-2,8,9-trioxa-5-aza-1-boratricyclo[3.3.3.0]undecane 240.3 parts by weight of styrene oxide were added dropwise with stirring to 75.1 parts by weight of isopropanolamine at about 50° C. over a 5½ hour period. The reaction mixture was allowed to stand for 3 days at room temperature, and 157.7 parts by weight of the resulting amine and 115.1 parts by weight of tributylborate were mixed and heated slowly to 175° C., with removal of the butanol by-product by stirring and distillation. A 3 mm. Hg vacuum was applied to strip last traces of butanol from the reaction product.

The resulting product, 3-methyl - 7,10 - diphenyl-2,8,9 - trioxa - 5 - aza - 1 - boratricyclo[3.3.3.0]undecane, was confirmed by infrared spectrum analysis. The product was insoluble in water; slightly soluble in isopropanol, methanol, acetonitrile and dioxane; and soluble in chloroform, hot methanol and hot isopropanol. It had a melting point of about 175° C.

Incorporation of the product of this example in sheets of polyvinyl chloride was found to produce a polymeric material having good antistatic properties.

EXAMPLE 4

Preparation of 11,14-dimethyl-2,12,13-trioxa-9-aza-1-boratetracyclo[7.3.3.0.0$^{3,8}$]pentadeca-3,5,7-triene 38.7 parts by weight of propylene oxide were added over a ¼ hour period to a slurry of 36.4 parts by weight o-aminophenol in 85 parts by weight p-dioxane. The reaction mixture was heated until reflux occurred. Heating was continued for about 16 hours up to a temperature of 60° C. Little or no reflux was observed at this point. 20.6 parts by weight of boric acid were then added, and the reaction mixture was heated slowly to 155° C. with removal of water by distillation. Vacuum of 28 inches gage was applied to remove last traces of water. The resulting product, 11,14 - dimethyl - 2,12,13 - trioxa-9 - aza - 1 - boratetracyclo[7.3.3.0.0$^{3,8}$]pentadeca - 3,5,6-triene, was confirmed by infrared spectrum analysis. This product had a boiling point of 189–192° C. at 1 mm. Hg.

Incorporation of the product of this example in sheets of polyvinyl chloride was found to produce a polymeric material having good antistatic properties.

EXAMPLE 5

Preparation of 3-hydroxymethyl-7,10-dimethyl-2,8,9-trioxa-5-aza-1-boratricyclo[3.3.3.0]undecane 45 parts by weight of glycidol in 125 parts by weight chloroform were added to 80.9 parts by weight 1,1'-iminodi-2-propanol in 175 parts by weight chloroform at room temperature. Exotherm was observed. The reaction mixture was allowed to stand at room temperature for three days. It was then concentrated to a thick oil by flashing off chloroform. 140 parts by weight of tributylborate were added and the mixture was then heated slowly to 190° C. with stirring and removal of butanol by distillation. The last traces of butanol were removed by a brief vacuum distillation. The resulting product 3-hydroxymethyl - 7,10 - dimethyl-2,8,9-trioxa-5-aza-1-boratricyclo[3.3.3.0]undecane, was confirmed by infrared analysis. It was soluble in water, methanol, acetone and chloroform and insoluble in hot toluene. It had a boiling point of 218–226° C. at 1.5 mm. Hg.

EXAMPLE 6

Preparation of 3 - hydroxymethyl - 7,10 - dimethyl - 2,8,9-trioxa-5-aza-1-boratricyclo[3.3.3.0]undecane acetate 4.2 parts by weight of 3-hydroxymethyl-7,10-dimethyl-2,8,9 - trioxa - 5-aza-1-boratricyclo[3.3.3.0]undecane produced by the procedure of Example 5 were heated to 80° C. with 5 parts by weight pyridine. 2.15 parts by weight of acetic anhydride were added and the reaction mixture was allowed to stand for two hours. The reaction solution was then stripped with 1 mm. Hg vacuum and a 65° C. bath. The resulting product, 3-hydroxymethyl-7,10 - dimethyl-2,8,9-trioxa-5-aza-1-boratricyclo[3.3.3.0] undecane acetate, was confirmed by infrared spectrum analysis, which showed a strong ester band. The product was soluble in hot toluene and chloroform, and insoluble in petroleum ether.

EXAMPLE 7

Preparation of 3 - hydroxymethyl - 7,10-dimethyl-2,8,9-trioxa-5-aza-1-boratricyclo[3.3.3.0]undecane palmitate 10 parts by weight of 3-hydroxymethyl-7,10-dimethyl-2,8,9 - trioxa - 5 - aza-1-boratricyclo[3.3.3.0]undecane, 30 parts by weight palmitoyl chloride and 80 parts by weight chloroform were refluxed for 12 hours. The chloroform was stripped off by distillation at 27 inches gage vacuum, and the excess palmitoyl chloride was stripped off at 1 mm. Hg by heating reaction mixture to 190° C. The resulting wax-like product, 3,-hydroxymethyl-7,10-dimethyl - 2,8,9 - trioxa-5-aza-1-boratricyclo[3.3.3.0]undecane palmitate, was confirmed by infrared spectrum analysis, which showed a strong ester band. The product was insoluble in methanol, soluble in chloroform, isopropanol and petroleum ether.

EXAMPLE 8

Preparation of 3-hydroxymethyl-7,10-dimethyl-2,8,9-trioxa-5-aza-1-boratricyclo[3.3.3.0]undecane stearate 100 parts by weight of glycidyl stearate and 43.2 parts by weight 1,1'-iminodi-2-propanol were heated at 60–80° C. for six hours. Excess amine was then stripped by distillation at 1 mm. Hg and a temperature of 200° C. 139 parts by weight of the resulting amine and 18.2 parts by weight of boric acid were heated to 150° C. with removal of water by distillation. The last traces of water were removed by 3 mm. Hg vacuum distillation at a temperature of 150° C. The resulting product, 3-hydroxymethyl - 7,10 - dimethyl-2,8,9-trioxa-5-aza-1-boratricyclo-[3.3.3.0]undecane stearate, was confirmed by infrared spectrum analysis. The melting point was about 75–85° C.

Incorporation of the product of this example in sheets of polyvinyl chloride was found to produce a polymeric material having good antistatic properties.

EXAMPLE 9

Preparation of 3 - hydroxymethyl-7,10-dimethyl-2,8,9-trioxa - 5 - aza-1-boratricyclo[3.3.3.0]undecane stearate by esterification of 3-hydroxymethyl-7,10-dimethyl-2,8,9 - trioxa - 5-aza-1-boratricyclo[3.3.3.0]undecane with stearic acid 5.5 parts by weight of 3-hydroxymethyl-7,10-dimethyl-2,8,9 - trioxa-5-aza-1-boratricyclo[3.3.3.0]undecane, produced by the procedure of Example 5, and 8 parts by weight of stearic acid were heated in 25 parts xylene containing a crystal of p-toluenesulfonic acid. The reaction was continued for three hours with continuous removal of xylene by distillation at 139° C. Periodic addition of xylene to the reaction mixture was effected throughout the reaction period. Analysis of an aliquot of the reaction product indicated a strong ester carbonyl band and other bands characteristic of the caged ring system with loss of hydroxyl bands, confirming the production of the stearate ester.

In corporation of the product of this example in sheets of polyvinyl chloride will produce a polymeric material having good antistatic properties.

EXAMPLE 10

Preparation of 3-hydroxymethyl-7,10-dimethyl-2,8,9-trioxa-5-aza-1-boratricyclo[3.3.3.0]undecane oleate 90 parts by weight of glycidyl oleate and 39.1 parts by weight of 1,1'-iminodi-2-propanol were heated at 60–80° for six hours. Excess amine was stripped by distillation at 1 mm. Hg and a temperature of 190° C. 125.6 parts by weight of resulting amine and 16.45 parts by weight of boric acid were heated slowly to 190° C. with removal of water by distillation. The last traces of water were removed by vacuum distillation at 1 mm. Hg. The resulting product, 3 - hydroxymethyl - 7,10-dimethyl-2,8,9-trioxa-5-aza-1-boratricyclo[3.3.3.0]undecane oleate, was confirmed by infrared spectrum analysis. The melting point of the wax-like product was about 31° C.

Incorporation of the product of this example in sheets of polyvinyl chloride was found to produce material having good antistatic properties.

EXAMPLE 11

Preparation of 3 - hydroxymethyl - 7,10 - dimethyl-2,8,9-trioxa - 5 - aza-1-boratricyclo[3.3.3.0]undecane neoacid ester 245 parts of "Cardura E" (the glycidyl ester of a mixture of $C_7$ to $C_9$ neoacids manufactured by Shell Industrial Chemicals Division) were added over a six-hour period to 133 parts of 1,1'-iminodi-2-propanol at 35–40° C. After the addition was completed, the mixture was heated to 65° C. to insure reaction. 303 parts of the resulting amine and 49.5 parts of boric acid were heated slowly to 140° C. with removal of water by distillation. The last traces of water were removed by 3 mm. Hg vacuum distillation at 150° C. The resulting product, 3-hydroxymethyl - 7,10 - dimethyl-2,8,9-trioxa-5-aza-1-boratricyclo[3.3.3.0]undecane neoacid ester, was confirmed by infrared spectrum. The product was liquid at room temperature and insoluble in water.

Incorporation of the product of this example in sheets of polyvinyl chloride was found to produce a polymeric material having good antistatic properties.

EXAMPLE 12

Preparation of 3 - hydroxymethyl - 7,10 - dimethyl-2,8,9-trioxa-5-aza-1-boratricyclo[3.3.3.0]undecane carbanilic acid ester 7.6 parts of 3-hydroxymethyl-7,10-dimethyl-2,8,9-trioxa-5-aza-1-boratricyclo[3.3.3.0]undecane were dissolved in 30 parts chloroform, and 4.2 parts of phenyl isocyanate were added to the solution. The reaction mixture was allowed to stand for 18 hours and the chloroform was then stripped by vacuum distillation. The residue was a glass-like solid, identified as 3-hydroxymethyl-7,10-dimethyl - 2,8,9 - trioxa-5-aza-1-boratricyclo[3.3.3.0]undecane carbanilic acid ester by strong urethane bands in the infrared spectrum.

EXAMPLE 13

Preparation of 3-phenoxymethyl-7,10-dimethyl-2,8,9-trioxa-5-aza-1-boratricyclo[3.3.3.0]undecane 140.2 parts 1,2-epoxy-3-phenoxypropane were added over a ½ hour period to 133.2 parts of 1,1'-iminodi-2-propanol at a temperature of about 40–60° C. The reaction mixture was heated at 50–60° C. for an additional hour and allowed to stand at room temperature for 18 hours. 61.84 parts of boric acid were added and the mixture heated slowly to 190° C. with removal of water by distillation. The last traces of water were removed by vacuum distillation at 190° C. The resulting product, 3-phenoxymethyl - 7,10 - dimethyl - 2,8,9 - trioxa-5-aza-1-boratricyclo[3.3.3.0]undecane, was confirmed by infrared spectrum analysis. The boiling point of the material was 234–240° C. at 1 mm. Hg.

Incorporation of the product of this example in sheets of polyvinyl chloride was found to produce a polymeric material having good antistatic properties.

EXAMPLE 14

Preparation of 3,7 - dihydroxymethyl - 10 - methyl-2,8,9-trioxa-5-aza-1-boratricyclo[3.3.3.0]undecane 45 parts of glycidol in 125 parts chloroform and 22.8 parts isopropanolamine in 125 parts chloroform were mixed and heated at 50° C. for 1¾ hours and then allowed to stand at room temperature for 18 hours. The chloroform was removed by vacuum distillation at 90° C. 69.9 parts of tributylborate were added and the reaction mixture was heated slowly to 150° C. with removal of butanol by distillation. The last traces of butanol were removed by vacuum distillation at 150° C. The resulting product, 3,7-dihydroxymethyl - 10 - methyl-2,8,9-trioxa-5-1-boratricyclo[3.3.3.0]undecane, was confirmed by infrared spectrum analysis. The material was soluble in methanol and hot acetonitrile.

Nuclear magnetic resonance studies on 3,7-dihydroxymethyl - 10 - methyl - 2,8,9 - trioxa - 5 - aza-1-boratricyclo [3.3.3.0]undecane diacetate (prepared by esterification of the product of this example in a manner similar to the procedure of Example 6) indicated that the product was a mixture of isomeric compounds containing both five and six-membered rings.

Incorporation of the product of this example in sheets of polyvinyl chloride was found to produce a polymeric material having good antistatic properties.

EXAMPLE 15

Preparation of 3,7 - dihydroxymethyl - 10 - methyl-2,8,9-trioxa-5-aza-1-boratricyclo[3.3.3.0]undecane 280 parts of 1,2-epoxy-3-phenoxypropane were added slowly to 75 g. isopropanolamine over a 3½ hour period at a temperature of less than 70° C. After the addition was completed, the reaction mixture was allowed to stand at room temperature for 18 hours. 61.8 parts of boric acid were added and the mixture was heated to 105° C. Water was removed from the reaction mixture by distillation, and the reaction mixture solidified after 24 parts of water had been removed. The solids residue was airdried at 70° C. for 18 hours. The resulting product, 3,7-diphenoxymethyl - 10 - methyl - 2,8,9-trioxa-5-aza-1-boratricyclo[3.3.3.0]undecane, was confirmed by infrared spectrum analysis. It was insoluble in toluene, and soluble in hot water, hot chloroform and hot methanol.

EXAMPLE 16

Preparation of 3,7 - dihydroxymethyl - 10 - methyl-2,8,9-trioxa-5-aza-1-boratricyclo[3.3.3.0]undecane dineoacid ester The procedure of Example 11 was repated in this example except that 490 parts of "Cardura E" were reacted with 75.1 parts of isopropanolamine, and the caged compound was then prepared from 565 parts of the resulting amine and 61.8 parts of boric acid. The reaction product, 3,7 - dihydroxymethyl - 10 - methyl-2,8,9-trioxa-5-aza-1-boratricyclo[3.3.3.0]undecane dineoacid ester, was confirmed by infrared spectrum. The product was liquid, insoluble in water and soluble in chloroform.

Incorporation of the product of this example in sheets of polyvinyl chloride was found to produce a polymeric material having good antistatic properties.

EXAMPLE 17

Preparation of 3-hydroxymethyl-7,10-dimethyl-2,8,9-trioxa-5-aza-1-boratricyclo[3.3.3.0]undecane pelargonate 160 parts of glycidyl pelargonate were added to 99.7 parts of 1,1'-iminodi-2-propanol over a one hour period. The reaction temperature was maintained at 35° C. during the addition, and the reaction mixture was then heated at 65° C. for ¼ hour and allowed to stand at room temperature for 18 hours. 46.3 parts of boric acid were added and the reaction temperature raised slowly to 170° C. with removal of water by distillation. The last traces of water were removed with 5 mm. Hg vacuum distillation and a pot temperature of 140° C.

EXAMPLE 18

Preparation of 3-hydroxymethyl-7,10-dimethyl-2,8,9-trioxa-5-aza-1-boratricyclo[3.3.3.0]undecane Emery 1210 monoester 134.1 parts of sodium hydroxide were dissolved in 940 parts water and 462.3 parts Emery 1210 acids (a mixture of $C_5$ to $C_9$ aliphatic monocarboxylic acids). The soap solution was evaporated on a steam bath and the soap mass dried to constant weight in a steam chest at 75–80° C. with periodic crushing of lumps.

360 parts of the resulting sodium soap and 750 parts epichlorohydrin were then heated to 95° C. with stirring. 5 parts of benzyltrimethylammonium chloride were added as a catalyst for this reaction. An exothermic reaction resulted which required cooling. The reaction was allowed to continue for ¾ hour, and the reaction mixture was then cooled to 60° C. and washed with water. The upper organic layer of the product was dried with 100 parts of anhydrous sodium sulfate. The product was then filtered and the filtrate was distilled. 246 parts distillate boiling at 88–107° C. at 1 mm. Hg was collected and characterized as the glycidyl ester.

160.9 parts of the glycidyl ester were added over a 2½ hour period to 117 parts 1,1'-iminodi-2-propanol at 40–50° C. The reaction mixture was then heated at 65–70° C. for two hours to insure formation of the desired amine. 54.3 parts of boric acid was added and the temperature increased slowly to 145° C. with removal of water by distillation. Last traces of water were removed by 29 inches gage vacuum distillation at 145° C. The resulting product, 3 - hydroxymethyl-7,10-dimethyl-2,8,9-trioxa-5-aza-1-boratricyclo[3.3.3.0]undecane Emery 1210 monoester, was confirmed by infrared spectrum analysis.

Incorporation of the product of this example in sheets of polyvinyl chloride was found to produce a polymeric material having good antistatic properties.

EXAMPLE 19

Preparation of 3,7,10-trihydroxymethyl-2,8,9-trioxa-5-aza-1-boratricyclo[3.3.3.0]undecane 740 parts of glycidol were added to 5000 parts concentrated ammonium hydroxide solution over a three-hour period with stirring. Exothermic reaction was observed. The excess ammonia was removed by heating the reaction mixture at 80° C. overnight and flashing the balance at 27 inches gage vacuum and 65° C. The residue was fractionally distilled to yield 450 gms., boiling point 114–119° C. at 3 mm. Hg, of 2,3-dihydroxypropylamine, amine value 87.6 (91.1 theory).

682 parts of glycidol were added slowly to 419 parts of the 2,3-dihydroxypropylamine over a 6½ hour period at 40–50° C. Gas chromatography indicated that less than 0.1% glycidol remained in the amine product.

102 parts of amine product and 26.7 parts of boric acid were heated slowly to 163° C. with removal of water by distillation. The last traces of water were removed by 29 inches gage vacuum distillation at 150° C. The resulting product, 3,7,10-trihydroxymethyl-2,8,9-trioxa-5-aza-1-boratricyclo[3.3.3.0]undecane, was confirmed by infrared spectrum analysis.

EXAMPLE 20

Preparation of 3,7-dihydroxymethyl-10-methyl-2,8,9-trioxa-5-aza - 1 - boratricyclo[3.3.3.0]undecane bismonophthalate 41.2 parts of 3,7-dihydroxymethyl-10-methyl-2,8,9-trioxa-5-aza-1-boratricyclo[3.3.3.0]undecane were dissolved in 250 parts acetonitrile at reflux. 52.8 parts of phthalic anhydride were added and reflux continued for 8 hours. On cooling to room temperature a viscous liquid separated. The viscous liquid was separated and dried to a thick oil under 29 inches gage vacuum at 80° C. The resulting product, 3,7-dihydroxymethyl-10-methyl-2,8,9-trioxa-5-aza - 1 - boratricyclo[3.3.3.0]undecane bismonophthalate, was confirmed by infrared spectrum analysis, which showed traces of hydroxyl and anhydride with strong ester and acid bands.

EXAMPLE 21

Preparation of 3,7-dihydroxymethyl-10-methyl-2,8,9-trioxa-5-aza-1-boratricyclo[3.3.3.0]undecane bis-3-isocyanato-4-methylcarbanilic acid ester 38.7 parts of 3,7-dihydroxymethyl-10-methyl-2,8,9-trioxa-5-aza-1-boratricyclo[3.3.3.0]undecane were dissolved in 250 parts of hot acetonitrile. The resulting solution was added rapidly to 42 parts toluene-2,4-diisocyanate and refluxed for four hours. A precipitate resulted. The slurry was concentrated to a solid by stripping on a flash evaporator at 65° C. and 27 inches gage vacuum. The resulting cream-colored, solid product, 3,7-dihydroxymethyl-10-methyl-2,8,9-trioxa-5-aza - 1 - boratricyclo[3.3.3.0]undecane bis-3-isocyanato-4-methylcarbanilic acid ester, was characterized by infrared spectrum analysis and found to contain urethane carbonyl, isocyanate and traces of hydroxyl bands. The product was insoluble in toluene and soluble in chloroform.

EXAMPLE 22

Preparation of 3-aminomethyl-7,10-dimethyl-2,8,9-trioxa-5-aza-1-boratricyclo[3.3.3.0]undecane 92.5 parts of epichlorohydrin were added slowly over a two hour period, with stirring at 30–35° C. to 133.2 parts of 1,1'-iminodi-2-propanol containing 3 parts water. Reaction mixture was stirred for an additional 4½ hours and 40.0 parts of sodium hydroxide in 65 parts of water were then added in ¼ hour followed by a ½ hour period of stirring. The entire reaction mixture was then poured into 1000 parts of concentrated ammonium hydroxide at room temperature and allowed to stand for 18 hours. The ammonia and water were stripped on a flash evaporator at 27 inches gage vacuum and 65° C. Chloroform was added to the residue and the salt separated from the amine by filtration. The chloroform was stripped from the filtrate by distillation and the residue distilled at 1 mm. Hg vacuum. The fraction boiling at 175–215° C. was collected and fractionally distilled using a 10" fractionating column. Approximately 50% of the material was stripped off. The residue had an equivalent weight of 104 (theory for γ-aminotriisopropanolamine is 103).

19.8 parts of the amine product and 5.91 parts of boric acid were heated slowly to remove the water of esterification. A 28 inch gage vacuum was employed to remove the last traces of water. The resulting product, 3-aminomethyl - 7,10 - dimethyl - 2,8,9 - trioxa - 5-aza-1-boratricyclo[3.3.3.0]undecane, was confirmed by infrared spectrum analysis. The product crystallized slowly at room temperature and was soluble in benzene, ethylacetate, methanol and chloroform.

EXAMPLE 23

Preparation of 3,7-dimethyl-10-dodecane-2,8,9-trioxa-5-aza-1-boratricyclo[3.3.3.0]undecane A mixture of 99.9 parts of 1,1'-iminodi-2-propanol and 105 parts of "Nedox 1114" (Nedox is a commercially available mixture of α-olefin oxide of $C_{11}$ to $C_{14}$ chain length, manufactured by Ashland Oil—ADM Division) was heated at 150–200° C. for five hours. The product was cooled and stripped of excess 1,1'-imindo-2-propanol by 2 mm. Hg vacuum distillation at a maxiumum pot temperature of 160° C.

171.6 parts of the amine residue and 30.9 parts of boric acid were heated slowly to 153° C. with removal of water by distillation. The last traces of water were removed with 28 inches gage vacuum at 153° C. The resulting product, 3,7 - dimethyl - 10-dodecane-2,8,9-trioxa-5-aza-1-boratricyclo[3.3.3.0]undecane, was confirmed by infrared spectrum. The product was soluble in hot ethylacetate.

This material is a mixture of $C_9$ to $C_{12}$ substituted caged ring compounds at carbon number 10 since the starting α-olefin oxide was a mixture of $C_{11}$ to $C_{14}$ oxides.

Incorporation of the product of this example in sheets of polyvinyl chloride was found to produce a polymeric material having good antistatic properties.

EXAMPLE 24

Preparation of 8,11-dihydroxymethyl-2,9,10-trioxa-6-aza-1-boratricyclo[4.3.3.0]dodecane 148.2 parts of glycidol were added slowly to 75.11 parts of n-propanolamine at 40–50° C. over a seven-hour period. 61.8 parts of boric acid were then added and the reaction mixture was heated slowly to 155° C. with removal of water by distillation. The last traces of water were removed by 28 inches gage vacuum distillation and maximum pot temperature of 165° C. The resulting product, 8,11-dihydroxymethyl-2,9,10-trioxa-6-aza-1-boratricyclo[4.3.3.0]dodecane, was confirmed by infrared spectrum analysis.

Hydrolytic stability studies confirmed that the resulting product is probably a mixture of isomeric caged compounds having both 5 and 6-membered ring structures.

Incorporation of the product of this example in sheets of polyvinyl chloride was found to produce a polymeric material having good antistatic properties.

EXAMPLE 25

Preparation of 8-hydroxymethyl-11-methyl-2,9,10-trioxa-6-aza-1-boratricyclo[4.3.3.0]dodecane 58 parts of propylene oxide were added slowly to 75.1 parts of n-propanolamine over a 1½ hour period at 35–50° C. The reaction mixture was stirred for an additional 1½ hours at 35–45° C. and 74.08 parts of glycidol were then added slowly over a two-hour period, while keeping the temperature under 65° C. The mixture was then stirred for 2½ hours. 61.8 parts of boric acid were added and the reaction mixture was heated slowly to 170° C. with removal of water by distillation. The last traces of water were removed by 28 inches gage vacuum distillation at a maximum pot temperature of 150° C. The resulting product, 8 - hydroxymethyl - 11 - methyl-2,9,10-trioxa-6-aza-1-boratricyclo[4.3.3.0]dodecane, was confirmed by infrared spectrum analysis.

This product is probably a mixture of isomeric caged compounds differing in 5 and 6-membered ring structures.

EXAMPLE 26

Preparation of 3 - allyloxymethyl-7,10-dimethyl-2,8,9-trioxa-5-aza-1-boratricyclo[3.3.3.0]undecane 114 parts of 1-allyloxy-2,3-epoxypropane were added slowly over a 1¾ hour period at 40–50° C. to 133 parts of 1,1'-iminodi-2-propanol. This resulting mixture was placed in steam chest at 75–80° C. for 18 hours. 61.8 parts of boric acid were added and the reaction mixture was heated to 150° C. with removal of water by distillation. The last traces of water were removed by 28 inches gage vacuum distillation at a maximum pot temperature of 160° C. High vacuum was applied (2 mm. Hg) and the desired product was removed by distillation. The major fraction boiled at 193–196° C. (2 mm. Hg) and was characterized by infrared spectrum analysis to be the desired product, 3 - allyloxymethyl - 7,10-dimethyl-2,8,9-trioxa-5-aza-1-boratricyclo[3.3.3.0]undecane. The material was liquid and soluble in ethyl acetate.

Incorporation of the product of this example in sheets of polyvinyl chloride was found to produce a polymeric material having good antistatic properties.

EXAMPLE 27

Preparation of 3-vinyl-7,10-dimethyl-2,8,9-trioxa-5-aza-1-boratricyclo[3.3.3.0]undecane 19.6 parts of butadiene monooxide were added over a ¼ hour period at 60° C. to 37.2 parts of 1,1'-iminodi-2-propanol. The reaction mixture was heated at 60–65° C. for 3½ hours. Upon heating to 88° C. no reflux was observed. 64.4 parts of tributylborate were added and the reaction mixture was heated slowly to 170° C. with removal of butylalcohol by distillation. The last traces of butyl alcohol were removed by 28 inches gage vacuum distillation at a maximum pot temperature of 140° C. The resulting material was distilled under 1 mm. Hg vacuum with main fraction boiling at 173–177° C. The resulting material, 3-vinyl-7,10-dimethyl-2,8,9-trioxa-5-aza-1-boratricyclo[3.3.3.0]undecane, was confirmed by infrared spectrum analysis. The product was a crystalline solid which was soluble in ethylacetate.

EXAMPLE 28

Preparation of 3-hydroxymethyl-2,8,9-trioxa-5-aza-1-boratricyclo[3.3.3.0]undecane stearate 34.6 parts of 2,2'-iminodiethanol and 96 parts of glycidyl-stearate were mixed and heated to 60° C. Exothermic reaction resulting, with a maximum temperature of 125° C. being recorded. The mixture was allowed to react for a total of 2¾ hours and 20.35 parts of boric acid were then added and the reaction mixture was heated slowly to 120° C. with continuous removal of water by distillation. The last traces of water were removed by 28 inches gage vacuum distillation with maximum pot temperature of 150° C. The resulting product, 3-hydroxymethyl - 2,8,9 - trioxa-5-aza-1-boratricyclo[3.3.3.0]undecane stearate, was confirmed by infrared spectrum analysis.

Incorporation of the product of this example in sheets of polyvinyl chloride was found to produce a polymeric material having good antistatic properties.

EXAMPLE 29

Preparation of 11,14-dimethyl-2,12,13-trioxa-9-aza-1-boratetracyclo[7.3.3.0.0$^{3,8}$]pentadecane 98.15 parts of 7-oxabicyclo[4.1.0]heptane (cyclohexene oxide), 133.19 parts of 1,1'-iminodi-2-propanol and 1 part of potassium acetate were mixed and allowed to stand for 10 days at 65–70° C. Attempts to strip the unreacted material from this mixture with 27 inches gage vacuum and a maximum pot temperature of 150° C. were unsuccessful. The amine equivalent weight of the reaction product was 265 (theory 231). 61.84 parts of boric acid were added and the reaction mixture was heated slowly to 155° C. with removal of water by distillation. The last traces of water were removed by 28 inches gage vacuum distillation at a maximum pot temperature of 150° C. The resulting material was distilled at 1 mm. Hg vacuum with its main fraction boiling at 200–204° C. The resulting product, 11,14-dimethyl-2,12,13-trioxa-9-aza-1-boratetracyclo[7.3.3.0.0$^{3,8}$]pentadecane, was characterized by infrared spectrum analysis.

Incorporation of the product of this example in sheets of polyvinyl chloride was found to produce a polymeric material having good antistatic properties.

EXAMPLE 30

Preparation of 3-hydroxymethyl-2,8,9-trioxa-5-aza-1-boratricyclo[3.3.3.0]undecane stearate 96.0 parts of glycidyl stearate were added to 34.7 parts diethanolamine. This mixture was heated at 60–130° C. for 3 hours. 130.7 parts of the resulting amine and 20.4 parts of boric acid were then heated to 150° C. with removal of water by distillation. The last traces of water were removed by 28 inches gage vacuum distillation at a temperature of 150° C. The resulting product, 3-hydroxymethyl - 2,8,9 - trioxa - 5 - aza - 1 - boratricyclo[3.3.3.0] undecane stearate, was confirmed by infrared spectrum analysis. The product was insoluble in petroleum ether, benzene, ethyl acetate and methanol.

EXAMPLE 31

Use of compounds of this invention as antistatic agents

Three parts by weight of the 3-hydroxymethyl-7,10-dimethyl-2,8,9-trioxa - 5 - aza - 1 - boratricyclo[3.3.3.0] undecane stearate produced in Example 8 was incorporated in both polyethylene and polypropylene resins by blending each of these polymers with the caged boron-nitrogen compound in a Waring blender for 1 to 2 minutes, fusing the blended resin mixture in a Brabender Plasticorder at 200° C., and then pressing at about 350° F. for 2 minutes at a pressure of 2000 p.s.i. The resulting samples were tested on a Rothschild Static Tester by applying a 100 volt charge to the samples and then measuring the percentage of the charge which dissipated in 15 minutes at 72° F. and 35% relative humidity. The polyethylene sample containing the caged boron-nitrogen compound retained only 61% of the charge at the end of the test period while a control polyethylene sample containing no antistatic agent retained 98% of the charge after the same period. The polypropylene sample containing the caged boron-nitrogen compound retained only 78% of the charge at the end of the test period as compared to 94% charge retention in a control sample containing no antistatic agent. In each case the polyethylene or polypropylene sample had a surface area of 40 cm.².

Results of the use of other of the caged boron-nitrogen compounds of this invention as antistatic agents for various other polymeric materials are reported in my copending application, Ser. No. 707,414, filed Feb. 23, 1968, now issued as U.S. Pat. 3,562,207.

The invention in its broader aspects, is not limited to the specific details shown and described, and departures may be made from such details within the spirit and scope of the accompanying claims without departing from the principles of the invention and without sacrificing its chief advantages.

What is claimed is:
1. A caged boron-nitrogen compound of the formula

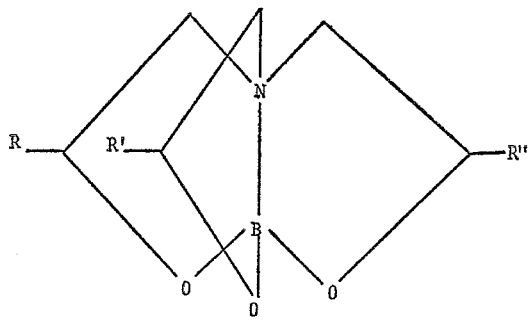

in which at least one of the R, R' and R" is a radical of the formula

where $R_n$ is a lower alkylene radical containing 1 to 6 carbon atoms and $R_m$ is selected from the group consisting of $C_1$–$C_{18}$ alkyl radicals, $C_1$–$C_{18}$ alkenyl radicals and aryl radicals and the remaining R, R' and R" radicals are selected from the group consisting of hydrogen and alkyl radicals containing from 1 to 16 carbon atoms.

2. 3-hydroxymethyl - 7,10 - dimethyl - 2,8,9 - trioxa-5-aza-1-boratricyclo[3.3.3.0]undecane acetate according to claim 1.

3. 3 - hydroxymethyl - 7,10 - dimethyl - 2,8,9 - trioxa-5-aza-1-boratricyclo[3.3.3.0]undecane palmitate according to claim 1.

4. 3-hydroxymethyl - 7,10 - dimethyl - 2,8,9 - trioxa-5-aza-1-boratricyclo[3.3.3.0]undecane stearate according to claim 1.

5. 3-hydroxymethyl - 7,10 - dimethyl - 2,8,9 - trioxa-5-aza-1-boratricyclo[3.3.3.0]undecane oleate according to claim 1.

6. 3-hydroxymethyl - 7,10 - dimethyl - 2,8,9 - trioxa-5-aza-1-boratricyclo[3.3.3.0]undecane pelargonate according to claim 1.

References Cited

UNITED STATES PATENTS 3,429,909  2/1969  Schuster _____ 260—462 R

OTHER REFERENCES

C. A., vol. 72, 1970, 4052c.

LEWIS GOTTS, Primary Examiner

E. G. LOVE, Assistant Examiner

U.S. Cl. X.R.

260—462 R, 469, 476 C, 486 B, 486 R, 488 R, 490

UNITED STATES PATENT OFFICE
CERTIFICATE OF CORRECTION

Patent No. 3,755,388                    Dated August 28, 1973

Inventor(s) Jerome H. Ludwig and Kenneth J. Witsken

It is certified that error appears in the above-identified patent and that said Letters Patent are hereby corrected as shown below:

Column 5, line 10, "undecant" should read ---undecane---; line 38, "aza-boratricyclo" should read---aza-1-boratricyclo---. Column 7, line 41, "aza-" should read--- aza-1- ---. Column 8, following the line "(2) Preparation of caged boron-nitrogen system" the following should be inserted:

or

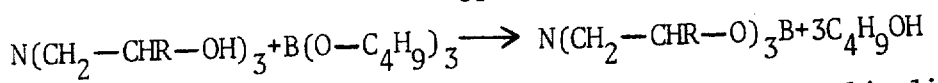

Column 14, line 28, "trioxa-5-" should read--- trioxa-5-aza- ---; line 44, "dihydroxymethyl" should read---diphenoxymethyl---; line 67, "repated" should read---repeated---. Column 17, line 11, "maxiumum" should read---maximum---.

Signed and sealed this 22nd day of January 1974.

(SEAL)
Attest:

EDWARD M. FLETCHER, JR.          RENE D. TEGTMEYER
Attesting Officer                 Acting Commissioner of Patents